(12) United States Patent
Howard

(10) Patent No.: US 10,767,812 B2
(45) Date of Patent: Sep. 8, 2020

(54) POST MOUNTABLE SUPPORT

(71) Applicant: Robert Lee Howard, Cypress, TX (US)

(72) Inventor: Robert Lee Howard, Cypress, TX (US)

( * ) Notice: Subject to any disclaimer, the term of this patent is extended or adjusted under 35 U.S.C. 154(b) by 0 days.

(21) Appl. No.: 15/687,968

(22) Filed: Aug. 28, 2017

(65) Prior Publication Data
US 2019/0063674 A1 Feb. 28, 2019

(51) Int. Cl.
| | | |
|---|---|---|
| F16M 13/02 | (2006.01) | |
| F16B 2/22 | (2006.01) | |
| E04H 15/32 | (2006.01) | |
| B65F 1/14 | (2006.01) | |
| E04H 15/00 | (2006.01) | |
| A45B 25/00 | (2006.01) | |

(52) U.S. Cl.
CPC ......... *F16M 13/022* (2013.01); *B65F 1/1415* (2013.01); *E04H 15/00* (2013.01); *E04H 15/32* (2013.01); *F16B 2/22* (2013.01); *A45B 2025/003* (2013.01)

(58) Field of Classification Search
CPC ............................... F16M 13/022; F16B 2/22
USPC ............ 248/903, 247, 300, 466, 475.1, 490
See application file for complete search history.

(56) References Cited

U.S. PATENT DOCUMENTS

| | | | | |
|---|---|---|---|---|
| 278,097 | A * | 5/1883 | Collins .................. | F16G 11/14 24/129 B |
| 2,216,886 | A * | 10/1940 | Langelier ................. | B01L 9/50 248/311.2 |
| D377,727 | S * | 2/1997 | Fairweather ................... | D6/552 |
| 6,098,933 | A * | 8/2000 | Stein ..................... | B65F 1/1415 248/99 |
| 7,503,095 | B2 * | 3/2009 | Lin ........................ | B60S 1/381 15/250.201 |
| 8,011,625 | B2 * | 9/2011 | Ginsberg ............... | A61B 5/061 248/205.1 |
| 2013/0168275 | A1 * | 7/2013 | Hennessey ........... | G06F 1/1626 206/320 |
| 2014/0021307 | A1 * | 1/2014 | McLauchlan ...... | H01R 13/5833 248/56 |

* cited by examiner

*Primary Examiner* — Muhammad Ijaz
(74) *Attorney, Agent, or Firm* — Matthew M. Googe; Robinson IP Law, PLLC

(57) ABSTRACT

A post mountable support includes: an elongate flexible bow having a first end and a second end that is distal from the first end; a top notch formed at the first end of the elongate flexible bow, the top notch including an open side and a tab extending at least partially over the open side of the top notch; a bottom notch formed at the second end of the elongate flexible bow, the bottom notch including an open side and a tab extending at least partially over the open side, the open side of the bottom notch facing a direction that is opposite a direction of the open side of the top notch; a connector attached to the elongate flexible bow between the top notch and the bottom notch, the connector configured to removably receive an accessory.

3 Claims, 1 Drawing Sheet

POST MOUNTABLE SUPPORT

FIELD

This disclosure relates to the field of supports. More particularly, this disclosure relates to a support for mounting trash bags and other accessories to a pole of a tent or other structure.

BACKGROUND

During outdoor activities, it is often desirable to have a location to mount a trash bag to collect garbage without leaving litter in an outdoor environment. In many cases, a tent or other structure is assembled at the location of an outdoor activity to provide shade and shelter to occupants of the tent. Often a trash bag will be tied or otherwise located on the tent, such as by tying the trash bag to a leg of a tent or canopy structure.

However, tying the trash bag to the leg of a tent makes it difficult to remove the trash bag for replacement. Similarly, attempts to mount trash bags or other objects on a tent or canopy structure do not provide sufficient support as the trash bag becomes full. Further, attachment of additional accessories to the tent or canopy structure are equally as difficult.

What is needed, therefore, is a post mountable support device that supports a trash bag or other items on a pole of a tent or canopy structure.

SUMMARY

The above and other needs are met by a post mountable support for supporting an accessory on a post. In a first aspect, a post mountable support includes: an elongate flexible bow having a first end and a second end that is distal from the first end; a top notch formed at the first end of the elongate flexible bow, the top notch including an open side and a tab extending at least partially over the open side of the top notch; a bottom notch formed at the second end of the elongate flexible bow, the bottom notch including an open side and a tab extending at least partially over the open side, the open side of the bottom notch facing a direction that is opposite a direction of the open side of the top notch; a connector attached to the elongate flexible bow between the top notch and the bottom notch, the connector configured to removably receive an accessory. When the top notch and bottom notch are secured to a post, the elongate flexible bow arcs away from the post.

In one embodiment, the top notch and bottom notch are rectangular in shape for engaging a rectangular post. In another embodiment, the connector comprising a dovetail connector for engaging a corresponding dovetail connector of an accessory.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Figures 1, 2:
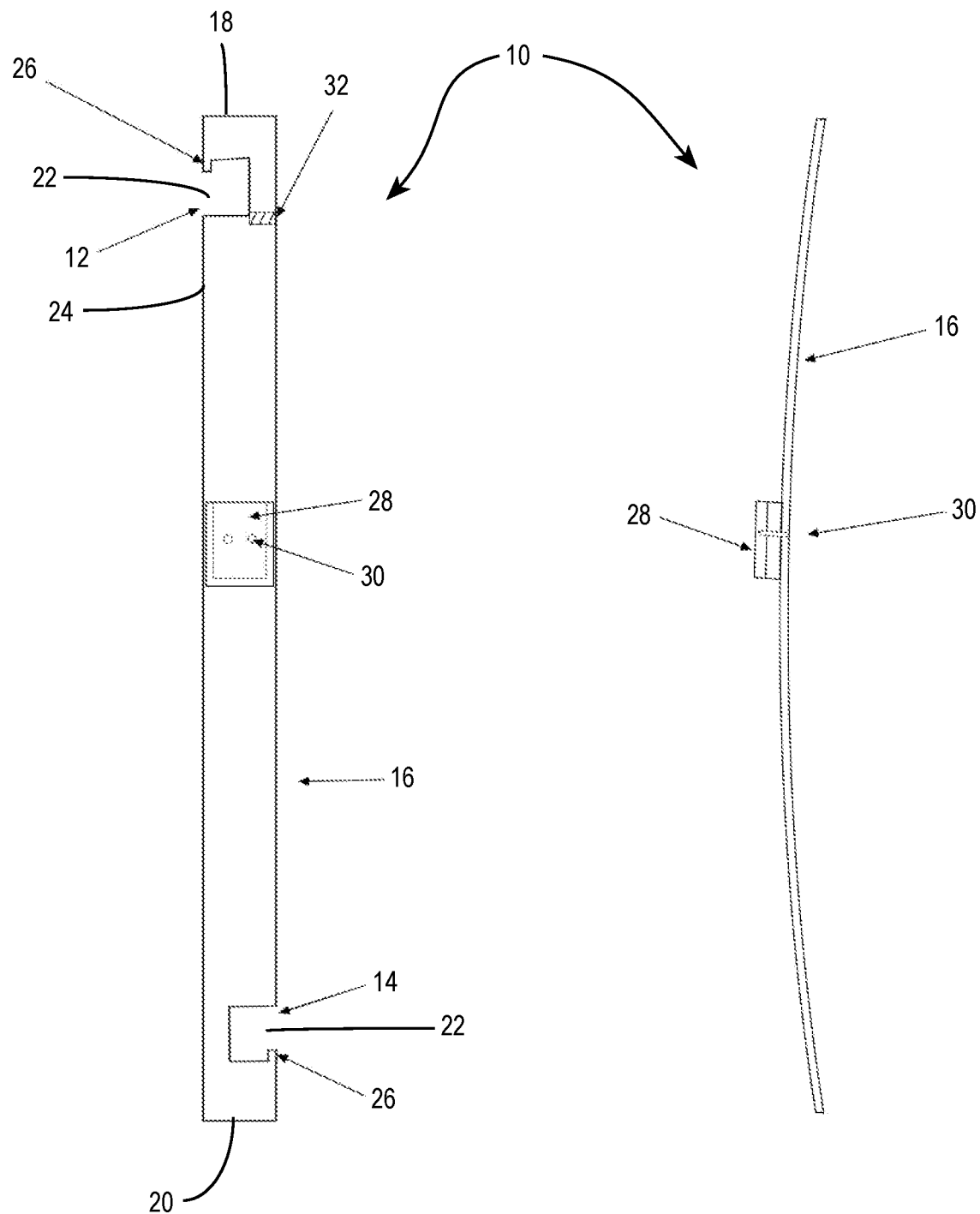
FIG. 1 is a front view of a post mountable support according to one embodiment of the present disclosure.
FIG. 2 is a side view of a post mountable support according to one embodiment of the present disclosure.

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

FIG. 1 shows a basic embodiment of a post mountable support 10 configured to be secured to a leg or stake of a tent or canopy structure. The post mountable support 10 is readily installed on a tent or canopy leg or other similar object to support an accessory, such as a trash bag, on the tent or canopy leg. The post mountable support 10 is readily installed or removed from the tent or canopy leg. The post mountable support 10 includes a top notch 12 and a bottom notch 14 at ends of an elongate flexible bow 16.

The elongate flexible bow 16 is preferably formed having an elongate flat shape such that the elongate flexible bow 16 is flexible along a length of the bow 16 (as shown in FIG. 2) while retaining lateral resilience such that the bow 16 resists flexion in a side-to-side direction. The elongate flexible bow 16 is preferably formed of a resiliently flexible material, such as a strip of acrylonitrile butadiene styrene (ABS) plastic. The elongate flexible bow 16 may be formed of other suitable materials such as various polymers, composites, or metals that would allow the flexible bow 16 to bend along a length of the bow.

With further reference to FIG. 1, the top notch 12 is formed towards a first end 18 of the elongate flexible bow 16. The top notch 12 is formed towards the first end 18 of the elongate flexible bow 16 such that the top notch 12 is located adjacent to the first end 18. The bottom notch 14 is formed towards a second end 20 of the elongate flexible bow 16 such that the bottom notch 14 is adjacent to the second end 20 of the elongate flexible bow 16. The top notch 12 and bottom notch 14 may be similarly formed in opposing shapes.

Both the top notch 12 and the bottom notch 14 include an open side 22 formed through an edge 24 of the elongate flexible bow 16. The open side 22 of the top notch 12 is preferably formed through a first side of the elongate flexible bow 16, while the open side 22 of the bottom notch 14 is preferably formed through a second side of the elongate flexible bow 16 that is opposite the first side. The top notch 12 and bottom notch 14 include the open side 22 such that the top notch 12 and bottom notch 14 are substantially three-sided. The top notch 12 and bottom notch 14 include a tab 26 extending towards the open side 22 along the edge 24. The tab 26 extends only partially into the open side 22 of the top notch 12 and bottom notch 14 such that the open side 22 remains substantially unobstructed for engaging a pole or leg of a tent or canopy structure as described in greater detail below. The top notch 12 and bottom notch 14 are preferably rectangular in shape and have dimensions suitable for engaging a leg or pole of a canopy or tent structure. For example, in one embodiment the top notch 12 and bottom notch 14 have a height of from about 1" to about 1.25" and a width of from about 1" to about 1.25". The top notch 12 and bottom notch 14 are preferably square-shaped such that the top notch 12 and bottom notch 14 conform to a square-shaped post or other mounting structure.

A connector 28 is located between the top notch 12 and bottom notch 14 for securing an accessory to the post mountable support 10. The connector 28 is preferably located at a midpoint of the elongate flexible bow 16, such as with a plurality of fasteners 30 secured to the connector 28 through the elongate flexible bow 16. The connector 28 is preferably one of a male or female dovetail connector that is adapted to removably engage an opposing male or female dovetail connector of an accessory.

A user attaches the post mountable support 10 to a post, such as a leg of a standing tent or shelter, with the top notch 12 and the bottom notch 14. When the post mountable support 10 is not attached to a post, the support 10 is substantially flat such that the top notch 12, bottom notch 14, and elongate flexible bow 16 are co-planar with one another. To attach the support 10, a user may first engage one of the top notch 12 and bottom notch 14 with the post by inserting the post through the open side 22 such that the post is located within one of the top notch 12 and bottom notch 14. The tab 26 is secured around the post to prevent the top notch 12 and bottom notch 14 from disengaging the post. The user also attaches the other of the top notch 12 and bottom notch 14 such that both the top notch 12 and bottom notch 14 are secured to the post. The top notch 12 and bottom notch 14 are secured to the post such that the elongate flexible bow 16 arcs away from the post, as shown in FIG. 2. The arc in the elongate flexible bow 16 is created when both the top notch 12 and bottom notch 14 are engaged with the post. A tension area 32 located adjacent the top notch 12 and bottom notch 14 causes the elongate flexible bow 16 to arc away from the post when the top notch 12 and bottom notch 14 are secured to the post.

After the post mountable support 10 is secured to a post, an accessory such as a trash bag or other accessory may be attached to the connector 28 of the post mountable support 10. The connector 28, which is preferably a dovetail connector, allows accessories having corresponding dovetail-shaped connectors to removably engage the connector 28.

When a user desires to remove the post mountable support, the user disengages the top notch 12 and bottom notch 14 through the open side 22 of the top notch 12 and bottom notch 14.

The post mountable support 10 of the present disclosure advantageously enables various accessories to attached to a post of a tent canopy or other structure, such as during outdoor events including tailgating and camping. Accessories can include a trash bag or other various accessories such as game accessories. Additionally, the elongate flexible bow 16 allows for substantial surface area for the placement of media such as advertisements for sports teams or other marketing advertisements.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A support securable to a post, the support comprising:
   an elongate bow having a first end and a second end that is distal from the first end and a first side edge and opposing second side edge;
   a top notch formed at the first end of the elongate bow, the top notch including
      an open portion formed on the first side edge of the elongate bow and
      a rectangular tab extending at least partially over an open side of the top notch, the tab extending only from a side of the open portion adjacent the first end of the elongate bow and extending into a middle of the top notch;
   a bottom notch formed at the second end of the elongate bow, the bottom notch including
      an open portion formed on the opposing second side edge of the elongate bow and
      a rectangular tab extending at least partially over an open side of the bottom notch, the tab of the bottom notch extending only from a side of the open portion adjacent the second end of the elongate bow and extending into a middle of the bottom notch;
   a tension area formed on the elongate bow adjacent to at least one of the top notch and the bottom notch, wherein when the post is secured within the top notch and the bottom notch, a middle portion of the elongate bow adjacent to a connector arcs away from the post from the tension area towards the middle portion;
   the connector attached to the elongate bow between the top notch and the bottom notch, the connector configured to removably receive an accessory;
   wherein when the support is not mounted on the post, the elongate bow is substantially flat; and
   wherein the top notch and bottom notch are shaped to receive and secure the support to the post with the top notch and the bottom notch to support a weight of the support, connector, and accessory on the connector.

2. The post mountable support of claim 1, wherein the top notch and bottom notch are rectangular in shape for engaging a rectangular post, and wherein the rectangular tab of the top notch and bottom notch extends perpendicular to side edges of the top notch and bottom notch.

3. The post mountable support of claim 1, wherein the connector comprising a dovetail connector for engaging a dovetail connector of an accessory.

* * * * *